United States Patent [19]

Niedospial

[11] Patent Number: 5,178,340

[45] Date of Patent: * Jan. 12, 1993

[54] FILM CASSETTE WITH COOPERATING STRIPPER AND LIGHT-LOCK

[75] Inventor: John J. Niedospial, Rochester, N.Y.

[73] Assignee: Eastman Kodak Company, Rochester, N.Y.

[*] Notice: The portion of the term of this patent subsequent to Jan. 28, 2009 has been disclaimed.

[21] Appl. No.: 679,847

[22] Filed: Apr. 3, 1991

[51] Int. Cl.⁵ ............................................ G03B 17/26
[52] U.S. Cl. .................................... 242/71.1; 354/275
[58] Field of Search ............................ 242/71.1, 71.2; 354/275, 277

[56] References Cited

U.S. PATENT DOCUMENTS 4,423,943  1/1984  Gold .................................. 242/71.1
4,883,235  11/1989  Niedospial, Jr. .................... 242/71.1
4,899,948  2/1990  Niedospial, Jr. et al. ......... 242/71.1

Primary Examiner—Daniel P. Stodola
Assistant Examiner—John Q. Nguyen
Attorney, Agent, or Firm—Roger A. Fields

[57] ABSTRACT

In a film cassette, a spool is supported for rotation in an unwinding direction inside a cassette shell, a convoluted film roll whose outermost convolution is a film leader is coiled in the unwinding direction about the spool and a film stripper is located substantially adjacent a passageway to the exterior of the shell to be received between a leading edge portion of the film leader and a next-inward convolution of the film roll responsive to rotation of the spool in the unwinding direction to divert the leading edge portion to between a pair of light-trapping pads spaced opposite each other in the passageway. According to the invention, one of the light-trapping pads is located closer to the stripper than the other of the pads and has a cut-out. The stripper is arranged in the cut-out to substantially ensure the leading edge portion of the film leader will be advanced over the one pad before the leading edge portion can be advanced farther than the stripper when the spool is rotated in the unwinding direction.

3 Claims, 12 Drawing Sheets

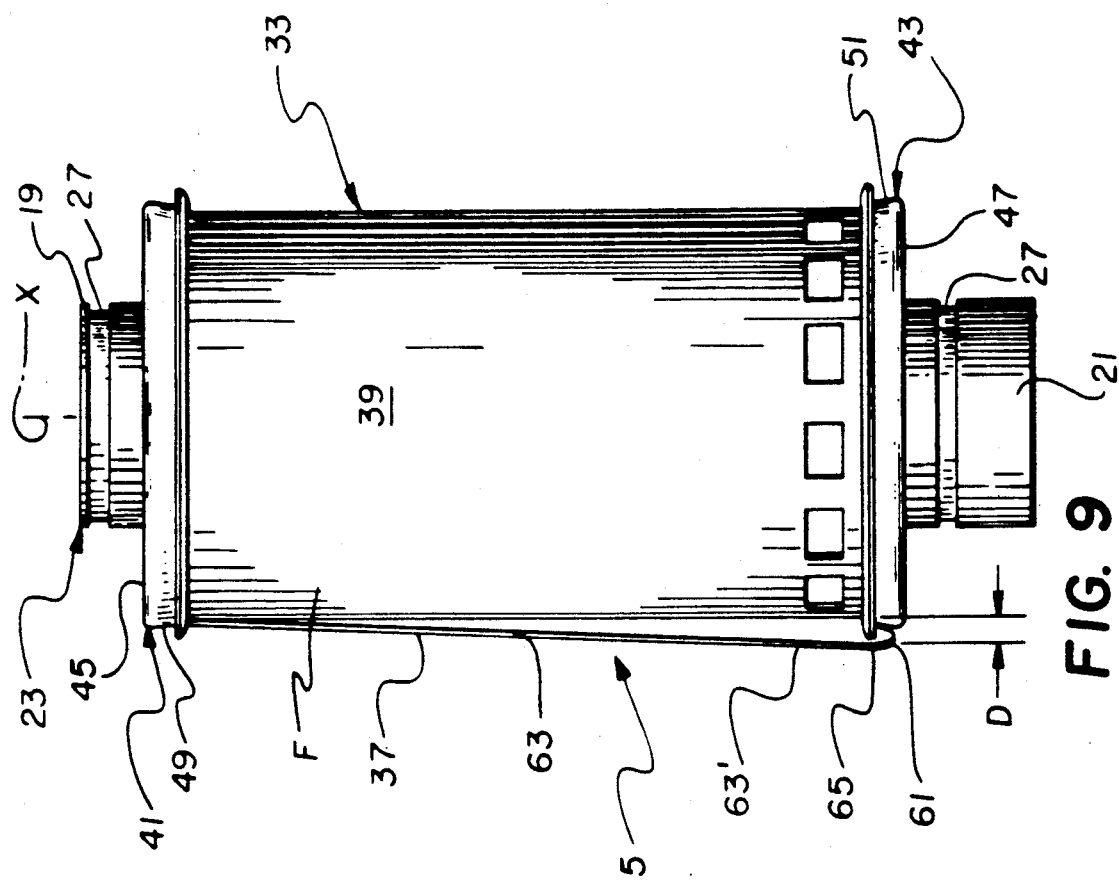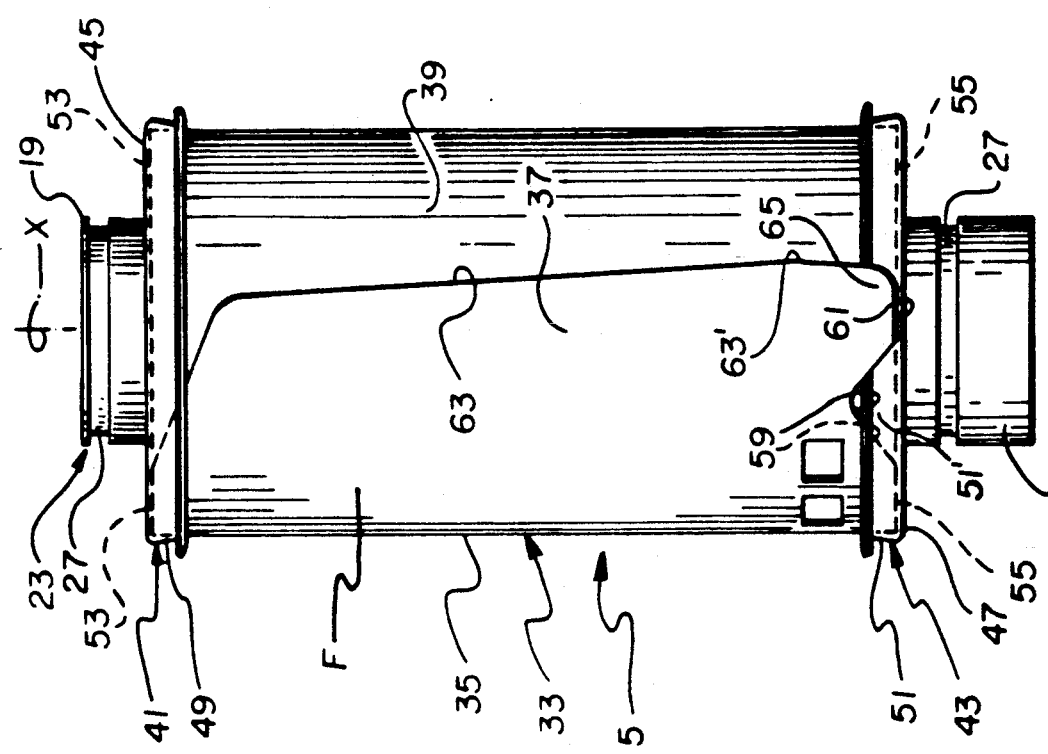

FILM CASSETTE WITH COOPERATING STRIPPER AND LIGHT-LOCK

Reference is made to commonly assigned co-pending application Ser. No. 07/679,844, now U.S. Pat. No. 5,083,720 entitled FILM CASSETTE WITH COOPERATING STRIPPER AND LIGHT-LOCK, and filed Apr. 3, 1991 in the names of John J. Niedospial et al.

BACKGROUND OF THE INVENTION

1. Field of the Invention

The invention relates generally to the field of photography, and in particular to a film cassette containing roll film. More specifically, the invention relates to a film cassette that is capable of automatically advancing a non-protruding film leader to the exterior of the cassette shell responsive to unwinding rotation of a film spool inside the shell.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forward-most section of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance a film leader out of the cassette shell by rotating the film spool in the unwinding direction. The film leader originally is located entirely inside the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall at a location inwardly of a non-lighttight film passageway to the outside of the cassette shell. During initial unwinding rotation of the film spool, the leading end of the filmstrip is advanced along the shell wall until it reaches an inner entrance to the film passageway. Then, it is advanced into and through the film passageway to the exterior of the cassette shell. The Passageway has a width that is less than the width of the filmstrip, thus resulting in the filmstrip being transversely bowed as it is uncoiled from the film spool, and thereby facilitating movement of the film edges under the circumferential lips of the flanges. However, severe transverse bowing of the filmstrip in order to move its longitudinal edges under the circumferential lips of the flanges may damage the filmstrip.

Like the type of film cassette disclosed in U.S. Pat. No. 4,423,943, commonly assigned U.S. Pat. No. 4,883,235 granted Nov. 28, 1989, discloses a film cassette that is capable of automatically advancing a non-protruding film leader to the exterior of the cassette shell in response to rotation of the film spool in the unwinding direction. Specifically, there is disclosed a film cassette wherein a film spool is supported for rotation in an unwinding direction inside a cassette shell, a convoluted film roll whose outermost convolution is a film leader is coiled in the unwinding direction about the spool, a pair of flanges are coaxially arranged along the spool to normally radially confine the film roll coiled about the spool, and a film stripper is located substantially adjacent a passageway to the exterior of the shell to be received between a leading edge portion of the film leader and a next-inward convolution of the film roll responsive to rotation of the spool in the unwinding direction to divert the leading edge portion to between a pair of light-trapping plush pads spaced opposite each other in the passageway. If the film roll has been stored on the spool for an unduly long time, e.g. 10 years, it may develop what is commonly referred to as a "core set". The core set, in essence, manifests itself as a lack of resistance of the film roll to being curled inward about the spool. Consequently, when the spool is rotated in the unwinding direction to move the leading edge portion of the film leader over the stripper, the leading edge portion (due to the leader's inward curl) may fall into a space between the stripper and one of the plush pads once the leading edge portion is advanced beyond the stripper. Since the film leader has a core set, it might remain in the space and cause a film jam inside the cassette shell.

THE CROSS-REFERENCED APPLICATION

The cross-referenced application discloses a film cassette wherein a spool is supported for rotation in an unwinding direction inside a cassette shell, a convoluted film roll whose outermost convolution is a film leader is coiled in the unwinding direction about the spool, and a film stripper is located substantially adjacent a passageway to the exterior of the shell to be received between a leading edge portion of the film leader and a next-inward convolution of the film roll responsive to rotation of the spool in the unwinding direction to divert the leading edge Portion to between a pair of light-trapping pads spaced opposite each other in the passageway. According to the invention, one of the light-trapping pads is located substantially in abutment with the stripper and the other of the pads is spaced from the stripper to generally ensure the leading edge portion of the film leader will be advanced over the one pad before the leading edge portion can be advanced over the other pad when the spool is rotated in the unwinding direction. Thus, the leading edge portion will be successively supported without any intervening gap first by the stripper and then by the one pad as it enters the passageway, thereby providing a solution to the problem posed above in connection with the prior art examples.

SUMMARY OF THE INVENTION

In a film cassette, a spool is supported for rotation in an unwinding direction inside a cassette shell, a convoluted film roll whose outermost convolution is a film leader is coiled in the unwinding direction about the spool, and a film stripper is located substantially adjacent a Passageway to the exterior of the shell to be received between a leading edge portion of the film leader and a next-inward convolution of the film roll responsive to rotation of the spool in the unwinding direction to divert the leading edge portion to between a pair of light-trapping pads spaced opposite each other in the passageway. According to the invention, one of the light-trapping pads is located closer to the stripper than the other of the pads and has a cut-out. The stripper is arranged in the cut-out to substantially ensure the leading edge portion of the film leader will be advanced over the one pad before the leading edge portion can be advanced farther than the stripper when the spool is rotated in the unwinding direction. Thus, the leading edge portion will be continuously supported by the stripper and/or the one pad as it enters the passageway, thereby providing a solution to the problem posed above in connection with the prior art examples.

BRIEF DESCRIPTION OF THE DRAWINGS

FIGS. 8 and 9 are elevation views of the film roll and the film spool, illustrating the manner in which the film roll is originally stored on the film spool;

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
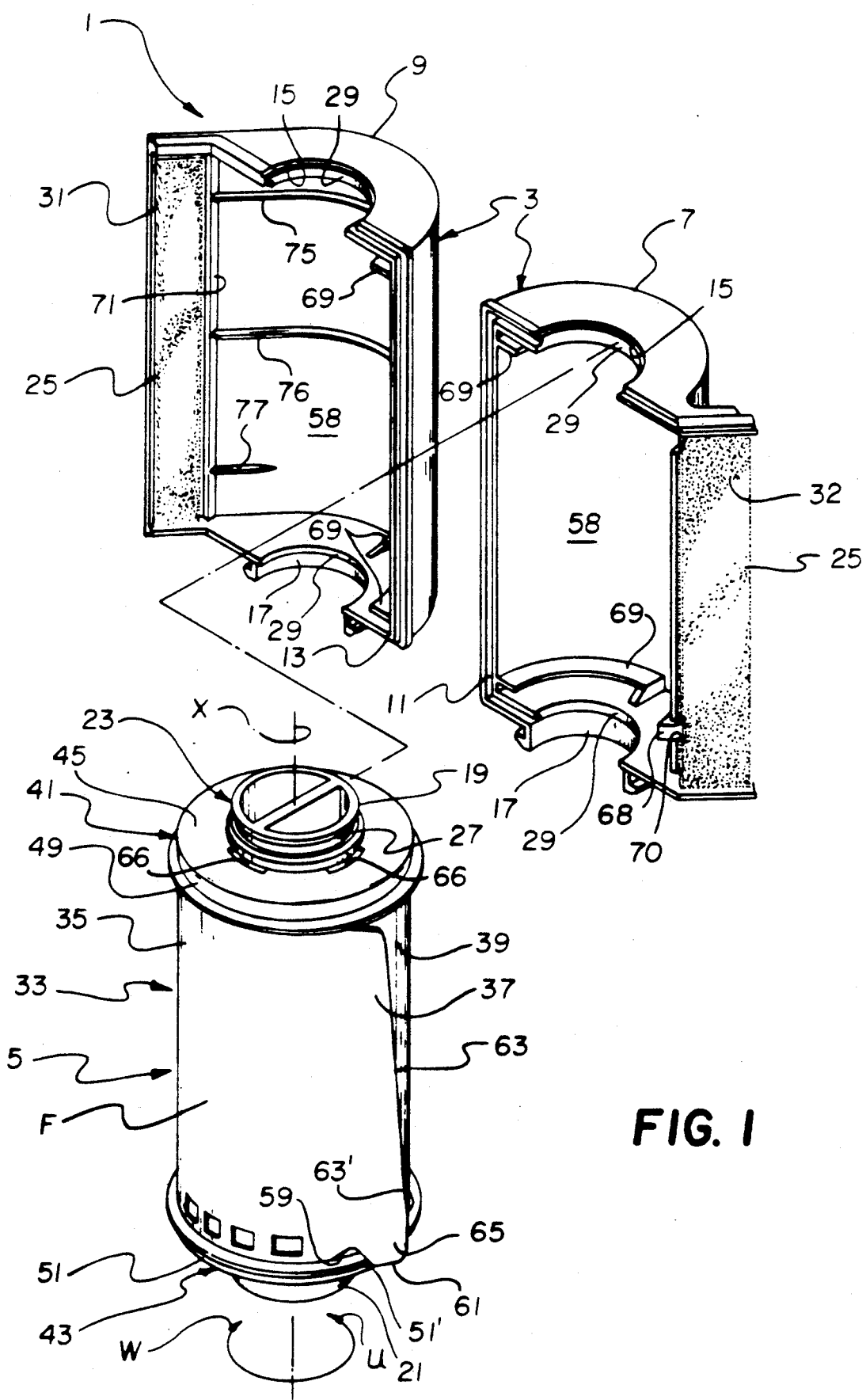
FIG. 1 is an exploded perspective view of a film cassette according to a preferred embodiment of the invention.
Figure 2:
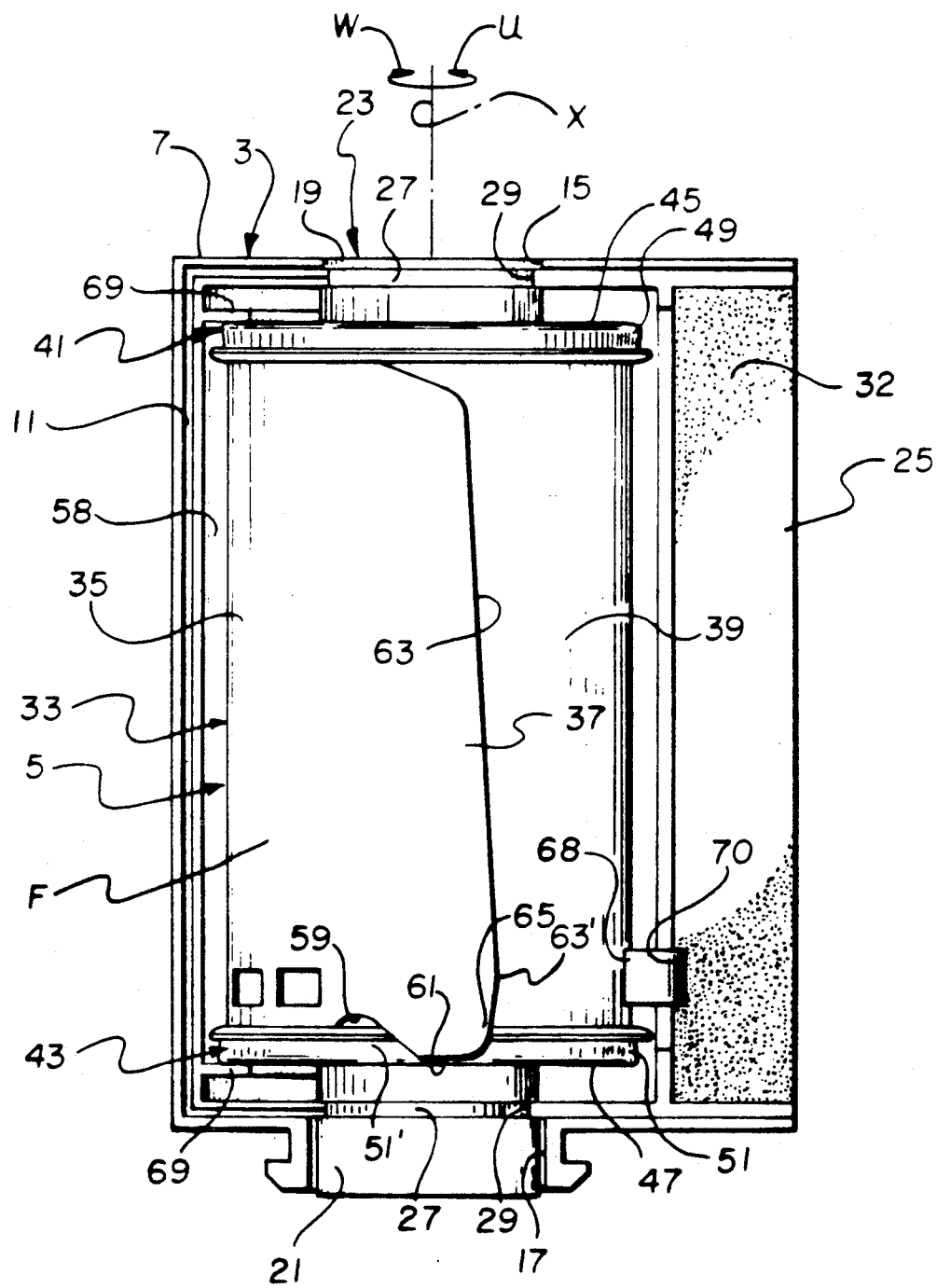
FIG. 2 is an elevation view of the film cassette, illustrating the cassette shell open to reveal a film roll coiled about a film spool.
Figure 12:
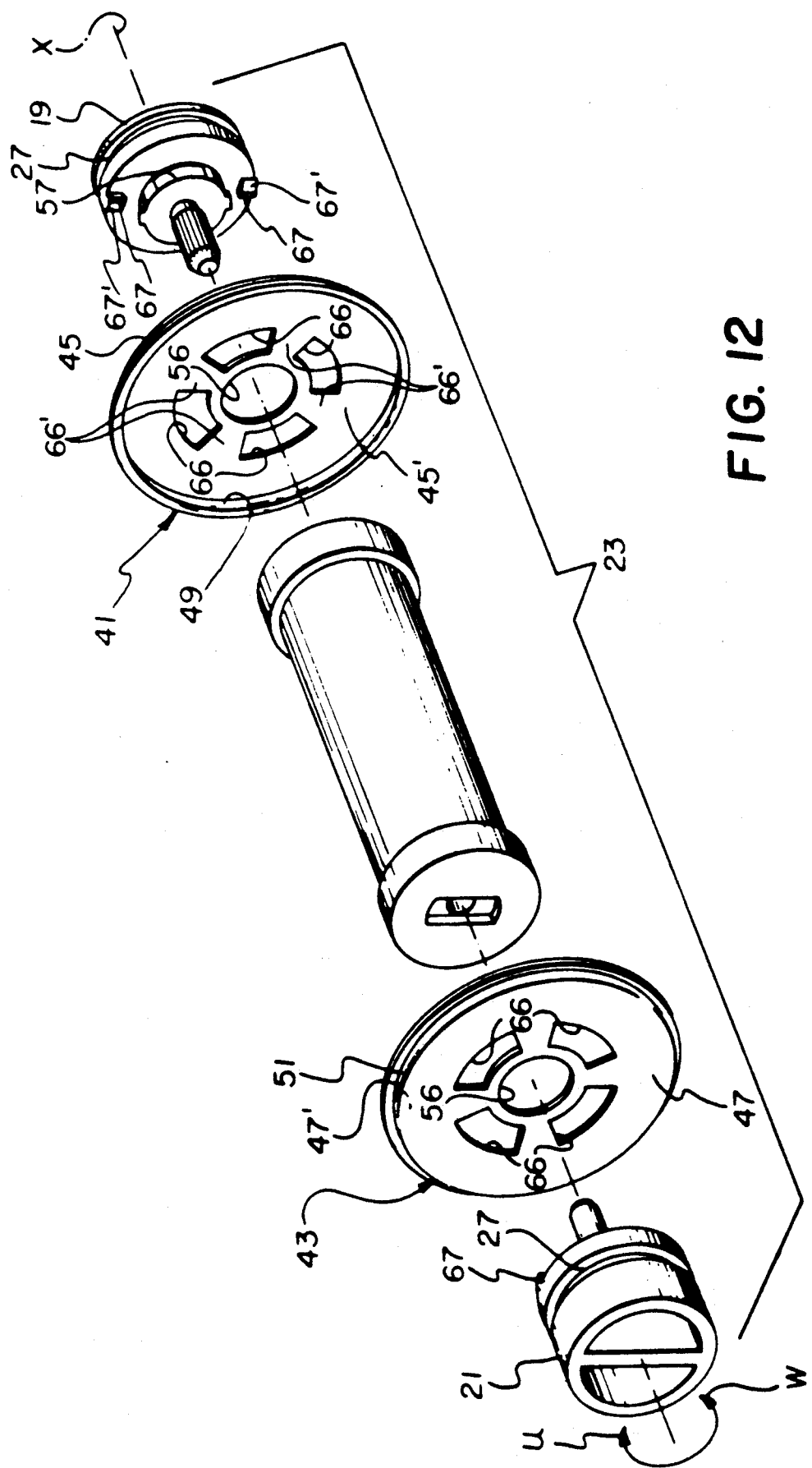
FIG. 12 is an exploded perspective view of the film spool without the film roll.

Referring now to the drawings, FIGS. 1, 2 and 12 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A pair of black velvet or plush pads 31 and 32 are secured at the interior of the film passageway 25 to the shell halves to prevent ambient light from entering the film passageway.

Figure 3:
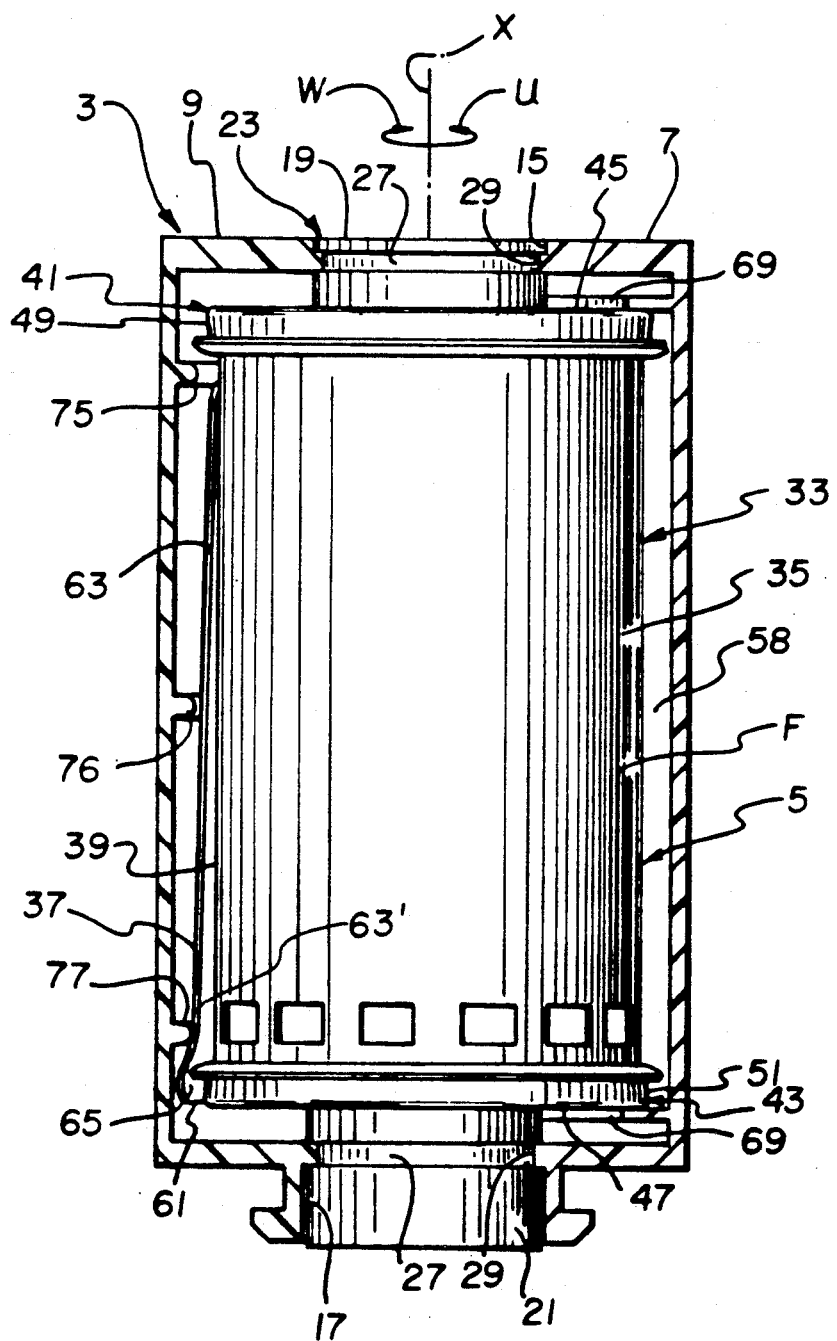
FIG. 3 is an elevation view similar to FIG. 2, through in section.
Figure 13:
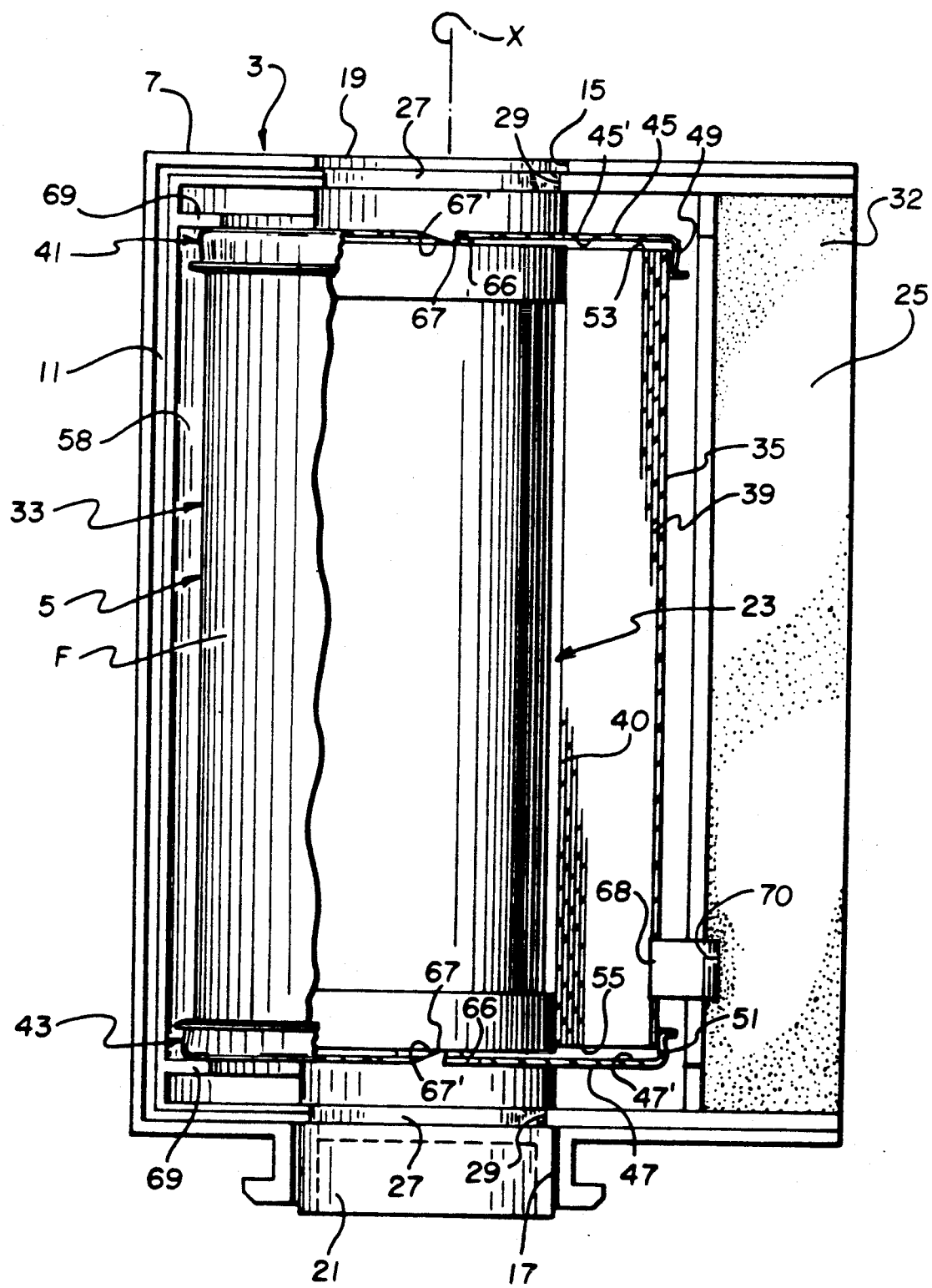
FIG. 13 is an elevation view partly in section of the film roll and the film spool, illustrating the manner in which a pair of film confining flanges of the spool may be fixed via respective engagement hooks to the spool for concurrent rotation with the spool.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

Figure 14:
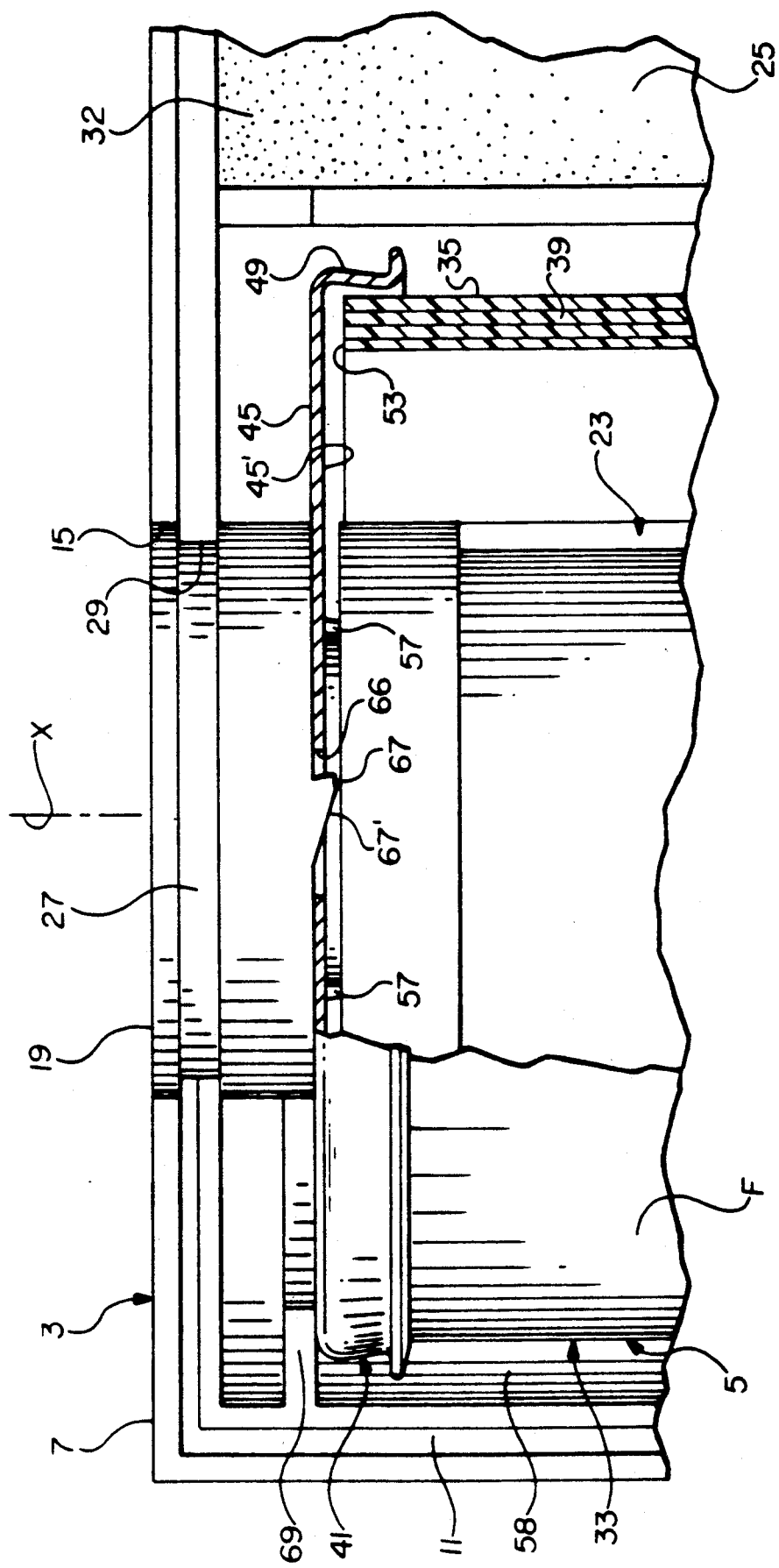
FIG. 14 is a blow-up of a particular portion of FIG. 13, illustrating one of the engagement hooks engaging one of the film confining flanges.
Figure 15:
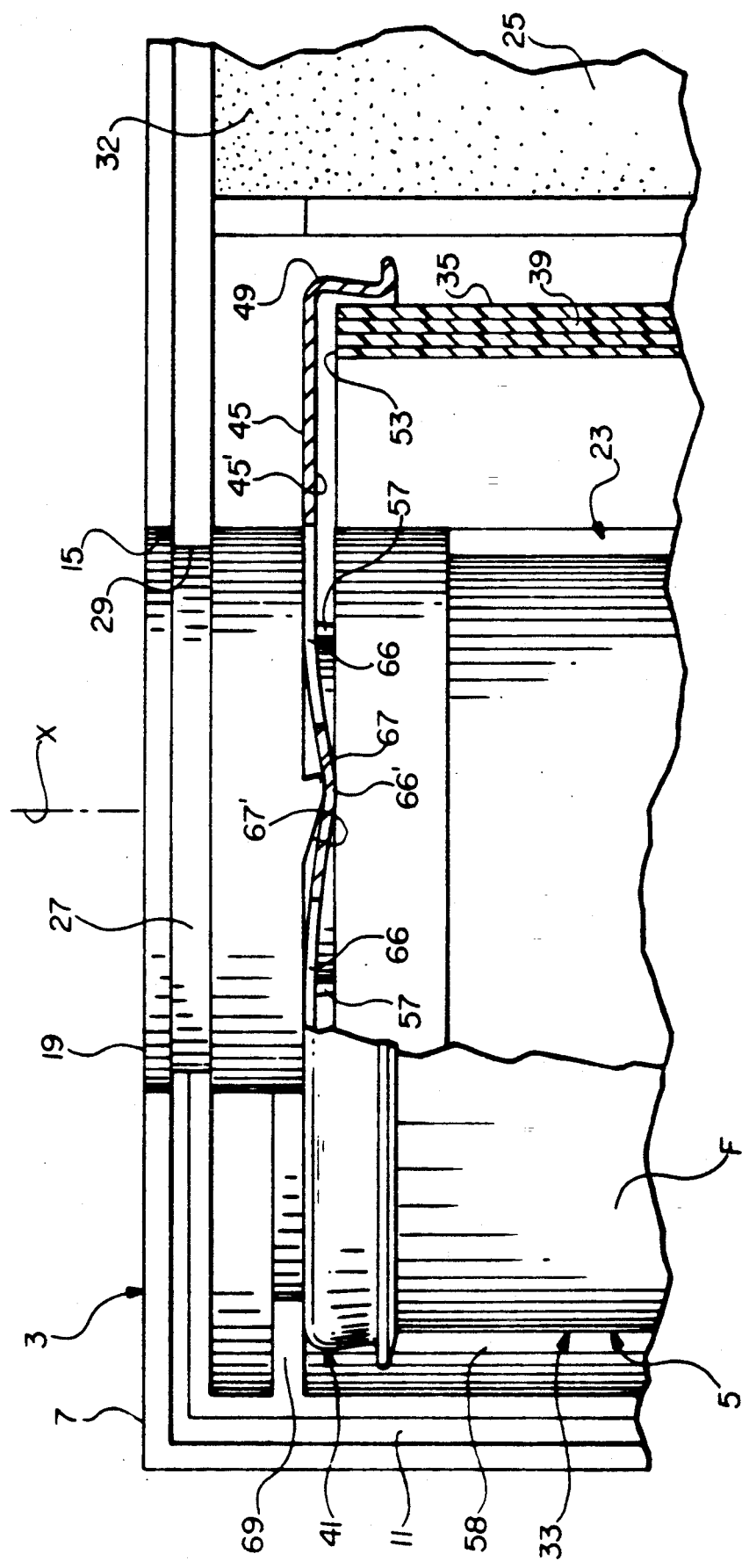
FIG. 15 is a blow-up similar to FIG. 14, illustrating the engagement hook not engaging the film confining flange.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. Respective pairs of supports 57, 57 and 57, 57 are fixed to the spool core 23 to support the flanges 41 and 43 at their disks 45 and 47. See FIGS. 12-14. The two pairs of supports 57, 57 and 57, 57 are sufficiently spaced from one another along the spool core 23 to maintain respective inner faces 45' and 47' of the disks 45 and 47 spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward or leading edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12-15. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

The two pairs of supports 57, 57 and 57, 57 are positioned to distort the flanges 41 and 43 at their disks 45 and 47 when the hook-like members 67 are not in the slots 66. See FIG. 15. More specifically, in this instance, the two pairs of supports 57, 57 and 57, 57 distort the flanges 45 and 47 in a manner such that respective flat areas 66' of the disks located between the slots 66 are urged firmly against the hook-like members 67. This will ensure that the hook-like members 67 are received in the slots 66 when the spool core 23 is rotated relative to the flanges 45 and 47 in the unwinding direction W, and thus will engage the flanges. See FIG. 14.

A film stripper-guide 68 projects from the interior wall 58 of the cassette half 7 toward the film roll 33. The stripper-guide 68 is positioned immediately inward of the inner entrance to the film passageway 25 to be received between the leading end 37 of the film leader (outermost convolution) 35 and the next-inward convolution 39, close to the forward-most tip 65 of the leader, to pick up an edge portion 63' of the forward or leading edge 63 of the leading end and guide it into the film passageway responsive to rotation of the spool core 23 in the unwinding direction U. See FIGS. 1 and 4-7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 4:
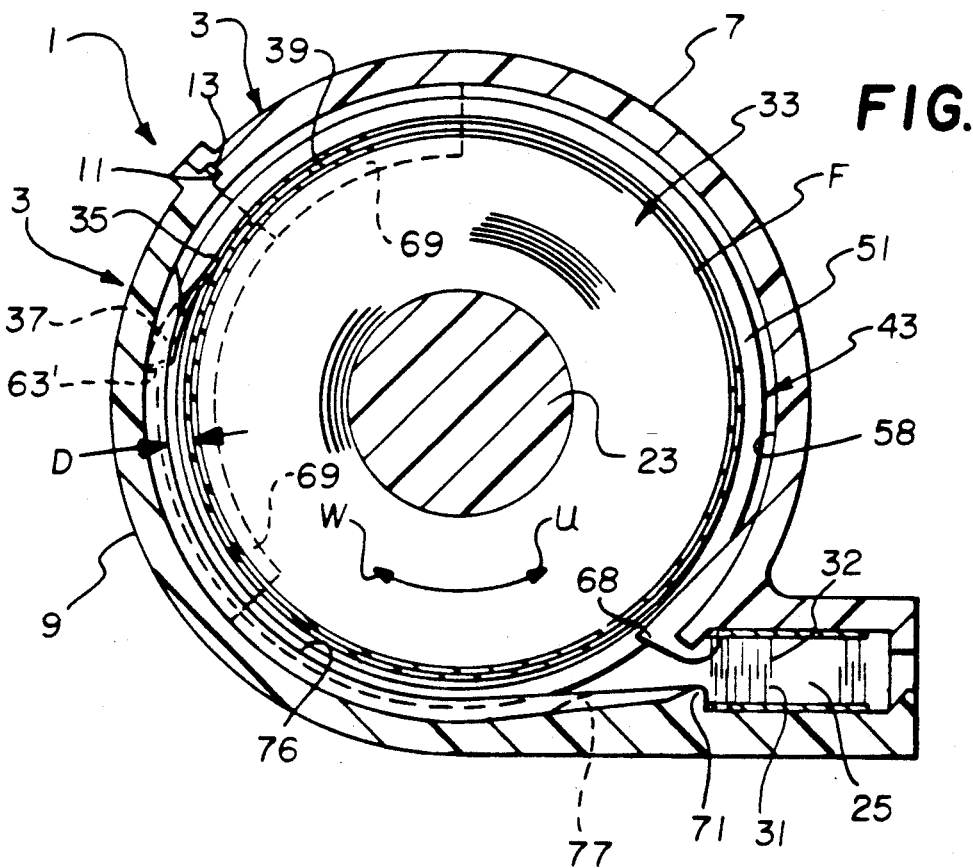
FIG. 4 is an end view partly in section of the cassette shell, the film roll and the film spool, illustrating the manner in which the film roll is originally stored on the film spool.
Figure 5:
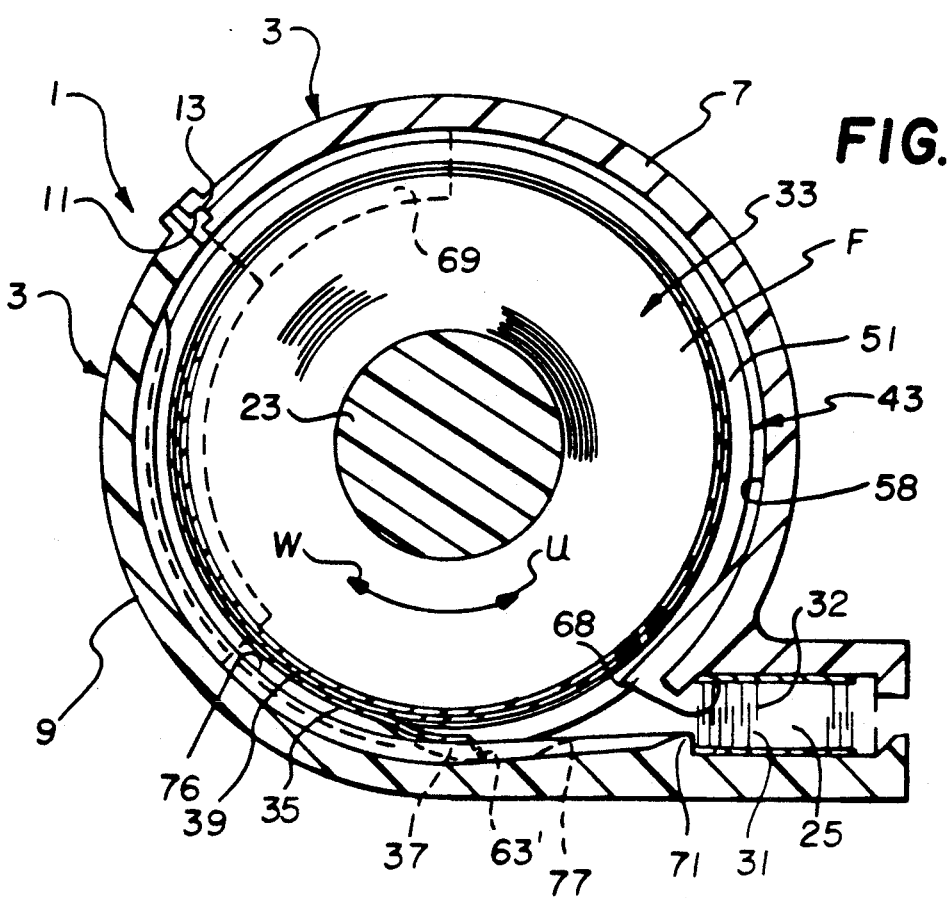
FIGS. 5, 6, and 7 are end views similar to FIG. 4, illustrating the manner in which the film roll is unwound from the film spool.
Figure 6:
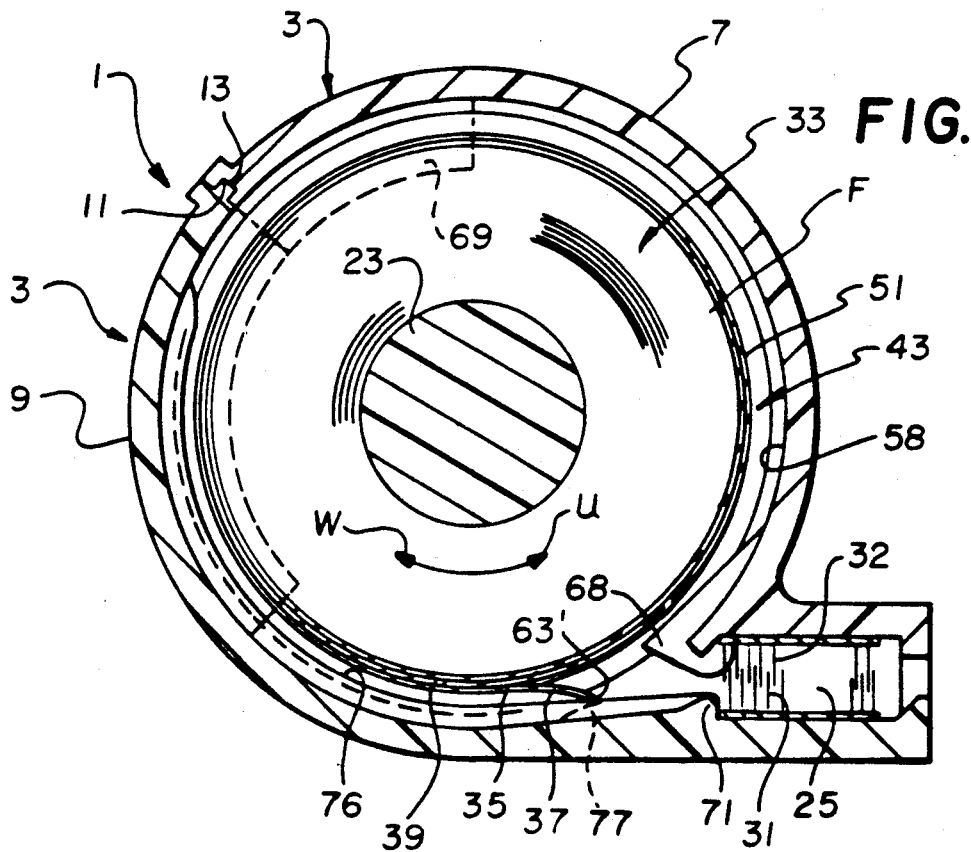
Figure 7:
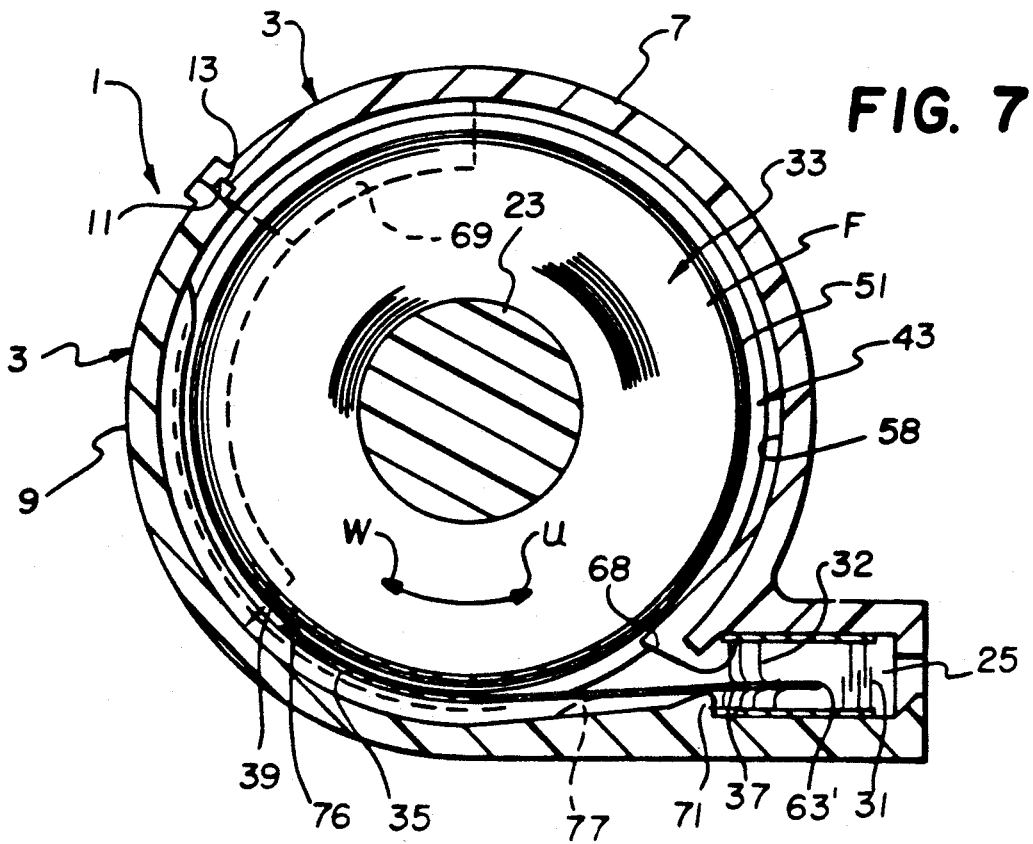

The plush pad 32 is located closer to the stripper-guide 68 than the plush pad 31 as can be seen in FIG. 4. The closer pad 32 has a cut-out 70 that is completely filled by the stripper-guide 68, although the stripper-guide extends part way out of the cut-out. See FIGS. 1 and 2. This is to generally ensure the edge portion 63' of the leading end 37 of the film leader (outermost convolution) 35 will be advanced over the closer pad 32 before the edge portion can be advanced beyond the stripper-guide 68 when the spool core 23 is rotated in the unwinding direction U. See FIG. 7. Thus, the edge portion 63' of the leading end 37 will be continuously supported by the stripper-guide 68 and/or the closer pad 32 as it enters the film passageway 25.

Figure 10:
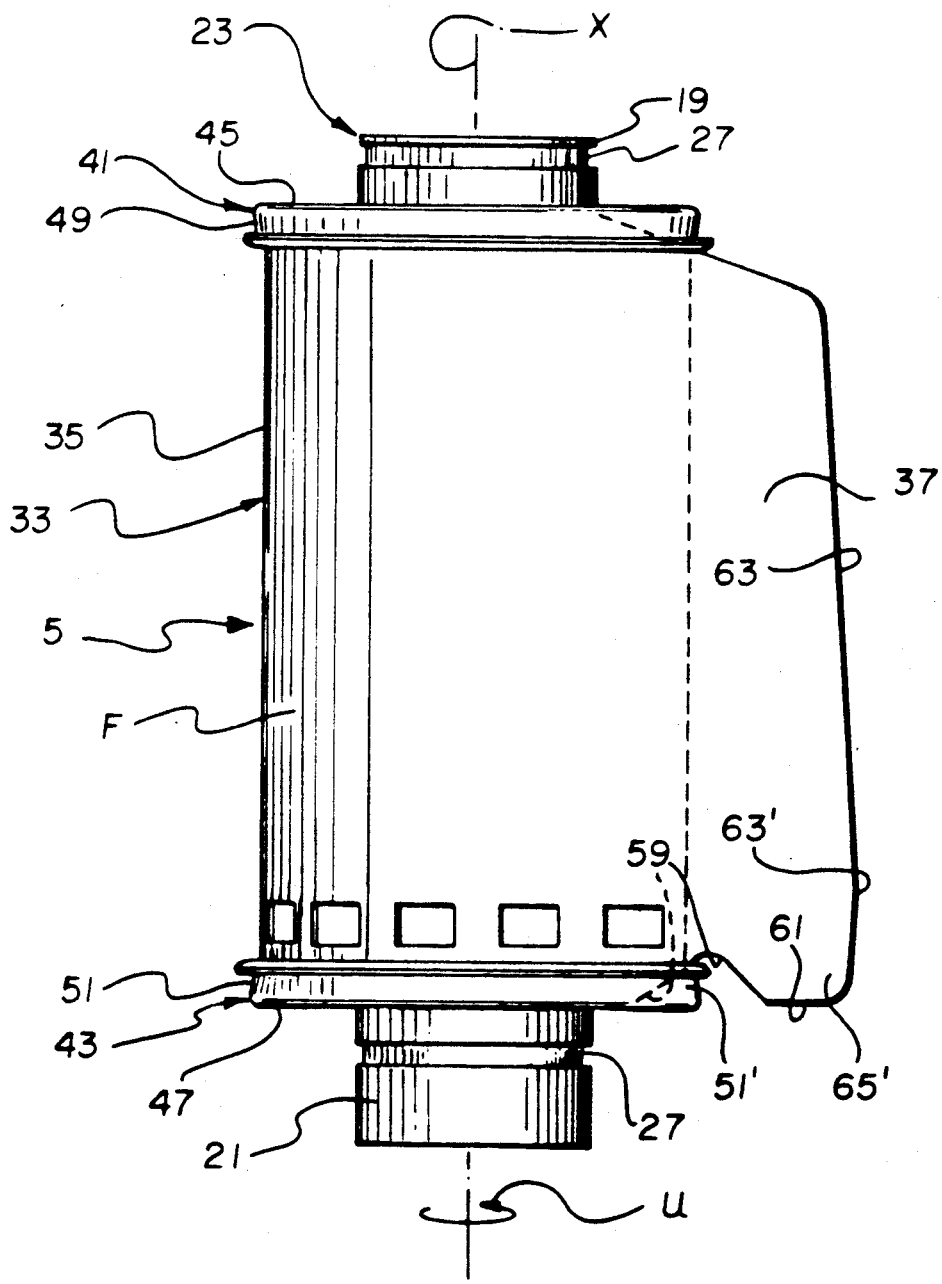
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35 substantially flat widthwise as those sections are freed from the flanges 41 and 43, to facilitate movement of such sections into the passageway. See FIGS. 1 and 7. Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

OPERATION

Figure 11:
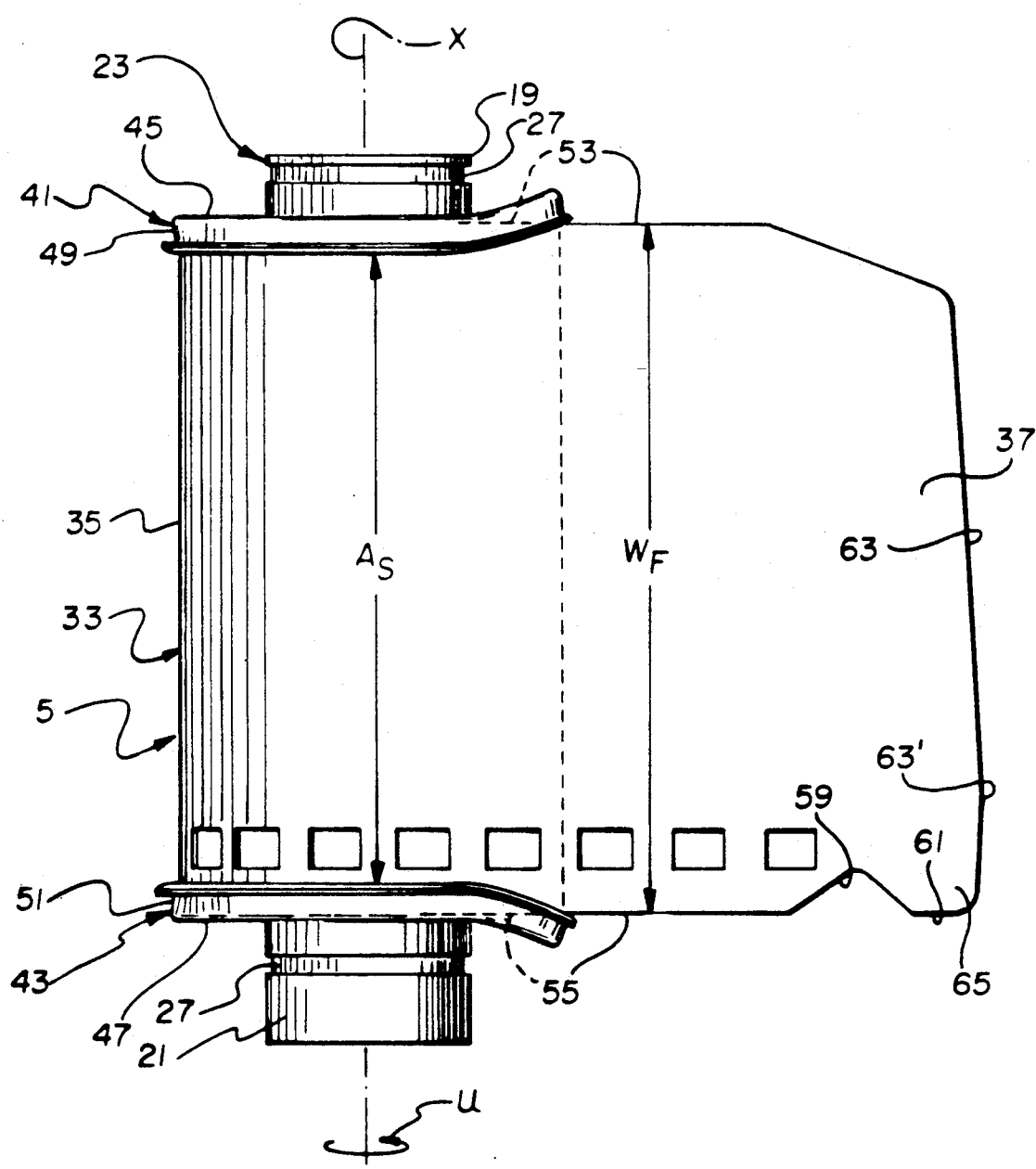

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51, the hook-like members 67 will have moved along the respective slots 66 (or from the flat areas 66' into the slots 66, and then) into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the edge portion 63' of the forward edge 63 of the leading end may move against the film flattening rib 71.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43.

The invention has been described with reference to a preferred embodiment. However, it will be appreciated that variations and modifications can be effected within the ordinary skill in the art without departing from the scope of the invention.

I claim:

1. A film cassette wherein (a) a spool is supported for rotation in an unwinding direction inside a cassette shell, (b) a convoluted film roll whose outermost convolution is a film leader is coiled in the unwinding direction about said spool, and (c) a film stripper is located substantially adjacent a passageway to the exterior of said shell to be received between a leading edge portion of said film leader and a next-inward convolution of said film roll, when said spool is rotated in the unwinding direction, to divert said leading edge portion to between a pair of light-trapping pads spaced opposite each other in said passageway, and wherein the improvement comprises:

one of said light-trapping pads is located closer to said stripper than the other of the pads and has a cut-out in which the stripper is arranged to substantially ensure the leading edge portion of said film leader will be advanced over said one of the pads before said leading edge portion can be advanced beyond the stripper when said spool is rotated in the unwinding direction.

2. The improvement as recited in claim 1, wherein said stripper completely fills said cut-out.

3. The improvement as recited in claim 2, wherein said stripper extends part way out of said cut-out toward the interior of said shell.

* * * * *